US008694247B2

(12) United States Patent
Lee

(10) Patent No.: US 8,694,247 B2
(45) Date of Patent: Apr. 8, 2014

(54) METHOD, MOBILE DEVICE AND COMPUTER-READABLE MEDIUM FOR DISPLAYING SURROUNDING POINTS OF INTEREST

(75) Inventor: Yu-Cheng Lee, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 124 days.

(21) Appl. No.: 13/074,010

(22) Filed: Mar. 29, 2011

(65) Prior Publication Data

US 2011/0238301 A1    Sep. 29, 2011

Related U.S. Application Data

(60) Provisional application No. 61/318,783, filed on Mar. 29, 2010.

(51) Int. Cl.
*G01C 21/00* (2006.01)
(52) U.S. Cl.
USPC .......................................................... 701/438
(58) Field of Classification Search
USPC .......................................................... 701/207
See application file for complete search history.

(56) References Cited

U.S. PATENT DOCUMENTS

| 2002/0047787 A1 | 4/2002 | Mikkola et al. | |
|---|---|---|---|
| 2002/0052674 A1 * | 5/2002 | Chang et al. | 700/300 |
| 2008/0076451 A1 | 3/2008 | Sheha et al. | |
| 2008/0129757 A1 | 6/2008 | Tanaka et al. | |
| 2009/0177381 A1 | 7/2009 | Taniguchi et al. | |
| 2010/0030465 A1 | 2/2010 | Solkesz et al. | |

FOREIGN PATENT DOCUMENTS

| CN | 1965317 | 5/2007 |
|---|---|---|
| CN | 101304432 | 11/2008 |
| EP | 1990711 | 11/2008 |
| TW | 200924467 | 6/2009 |
| TW | 200931336 | 7/2009 |
| WO | 2004003705 | 1/2004 |

OTHER PUBLICATIONS iPhone Safari User Guide, archived by archive.org on Nov. 5, 2009.*
"Search Report of Europe Counterpart Application", issued on Oct. 19, 2011, p. 1-p. 3, in which the listed references were cited.
"Office Action of China Counterpart Application", issued on Dec. 14, 2012, p. 1-p. 5, in which the listed references were cited.
"Office Action of Taiwan Counterpart Application", issued on Nov. 18, 2013, pp. 1-7.

* cited by examiner

*Primary Examiner* — Thomas Tarcza
*Assistant Examiner* — Garrett Evans
(74) *Attorney, Agent, or Firm* — Jianq Chyun IP Office

(57) ABSTRACT

A method, a mobile device, and a computer-readable medium for displaying surrounding points of interest (POIs), adapted to a mobile device, are provided. In the present method, at least one keyword is received and set as a searching condition for searching POIs. When the mobile device obtains new current location information of the mobile device, a POI database is queried to find surrounding POIs of the current location that fit the searching condition. Finally, the searched POIs are updated and displayed.

14 Claims, 4 Drawing Sheets

METHOD, MOBILE DEVICE AND COMPUTER-READABLE MEDIUM FOR DISPLAYING SURROUNDING POINTS OF INTEREST

CROSS-REFERENCE TO RELATED APPLICATION

This application claims the priority benefit of U.S. provisional application Ser. No. 61/318,783, filed on Mar. 29, 2010. The entirety of the above-mentioned patent application is hereby incorporated by reference herein and made a part of this specification.

BACKGROUND

In recent years, with development and improvement of electronic technology and communication techniques, portable electronic devices such as mobile phones and smart phones that occupy less space are also quickly developed. Generally, multiple functions are integrated to mobile devices in the market to improve competitiveness thereof, and besides general camera, phone call and Internet access functions, a global positioning system (GPS) and an electronic map are also integrated to a handheld communication device, and a user can learn a location of himself through a positioning function of the mobile device at any time.

The GPS is a positioning technique integrating satellites and wireless communication, which can provide accurate location, speed and time information. The GPS can be combined with an electronic map to display the positioning information on the electronic map to facilitate a user learning a current location. The electronic map records information of a plurality of points of interest (POIs), and according to such information, besides learning the current location, the user can also check restaurants, landmarks, scenic spots, or other POIs around the current location. In this way, the user can search the POIs intended to visit with assistance of the electronic map.

However, since the number of the POIs in the electronic map is numerous, when the user uses the mobile device to search the surrounding POIs, a large amount of undesired POIs is generally found, and time and effort has to be spent to find the desired POIs from a long list of POIs, which is rather inconvenient.

SUMMARY

The application is directed to a method, a mobile device, and a computer-readable medium for displaying surrounding points of interest (POIs), by which desired POIs can be searched according to user's preference.

The application provides a method for displaying surrounding POIs, which is adapted to a mobile device. In the method, at least one keyword is received and set as a searching condition for searching a plurality of POIs. When new current location information of the mobile device is received, a POI database is automatically queried according to the new current location information to find surrounding POIs of the new current location information that fit the searching condition, and the searched POIs are automatically updated and displayed.

In an example of the application, the step of automatically updating and displaying the searched POIs comprises displaying POIs of each of the keywords in an independent page, and displaying the pages corresponding to the keywords in overlapping.

In an example of the application, after the step of displaying the pages corresponding to the keywords in overlapping, the method further comprises receiving a switching operation from a user to switch a page corresponding to a displayed keyword to a page corresponding to a next keyword.

In an example of the application, after the step of displaying the pages corresponding to the keywords in overlapping, the method further comprises receiving an active operation of a POI list key from a user, so as to display POIs fitting all keywords in the searching condition on a POI list.

In an example of the application, the step of setting the searching condition for searching the POIs comprises receiving a setting of POI category, and setting the POI category as the searching condition for searching the POIs.

In an example of the application, the step of updating and displaying the searched POIs comprises displaying the searched POIs in categories according to the POI categories in the searching condition.

In an example of the application, the step of displaying the searched POIs in categories according to the POI categories in the searching condition comprises displaying POIs of each of the POI categories in an independent page, and displaying the pages corresponding to the POI categories in overlapping.

In an example of the application, the page corresponding to a main POI category in the POI categories is located on top of all of the pages.

In an example of the application, after the step of displaying the pages corresponding to the POI categories in overlapping, the method further comprises receiving a switching operation from the user to switch the page corresponding to the main POI category to a page corresponding to a next POI category.

In an example of the application, after the step of displaying the searched POIs in categories according to the POI categories in the searching condition, the method further comprises receiving an active operation of a POI list key from a user, so as to display the POIs of all of the POI categories in the searching condition on a POI list.

In an example of the application, the step of setting the searching condition for searching the POIs comprises receiving a searching distance input by a user, and setting the searching distance as the searching condition for searching the POIs.

The application provides a mobile device for displaying surrounding POIs, which comprises a display unit, an input unit, a positioning unit, a setting module, a query module, and a display module. The input unit is used for receiving at least one keyword input by a user. The positioning unit executes positioning to obtain new current location information. The setting module sets the keyword as a searching condition for searching a plurality of POIs. The query module automatically finds surrounding POIs of the new current location information that fit the searching condition when receiving new current location information of the mobile device from the positioning unit. The display module automatically updates and displays the searched POIs on the display unit.

In an example of the application, the display module displays POIs of each of the keywords in an independent page, and displays the pages corresponding to the keywords in overlapping.

In an example of the application, the input unit further receives a switching operation from the user, and the display module switches a page corresponding to a keyword displayed by the display unit to a page corresponding to a next keyword when the input unit receives the switching operation.

In an example of the application, the input unit further receives an active operation of a POI list key from the user, and the display module displays all POIs in the page corresponding to the keyword of the searching condition on a POI list when the input unit receives the active operation.

In an example of the application, the input unit further receives a setting of POI category from the user, and the setting module sets the POI category as the searching condition for searching the POIs.

In an example of the application, the display module displays POIs fitting the keyword under each of the POI categories in categories according to the POI categories and the keyword in the searching condition.

In an example of the application, the display module displays POIs of each of the POI categories in an independent page, and displays the pages corresponding to the POI categories in overlapping.

In an example of the application, the page corresponding to a main POI category in the POI categories is located on top of all of the pages.

In an example of the application, the input unit further receives a switching operation from the user, and the display module switches the page corresponding to the main POI category that is displayed by the display unit to a page corresponding to a next POI category when the input unit receives the switching operation.

In an example of the application, the input unit further receives an active operation of a POI list key from a user, and the display module displays the POIs of all of the POI categories in the searching condition on a POI list when the input unit receives the active operation.

In an example of the application, the input unit further receives a searching distance from the user, and the setting module sets the searching distance as the searching condition for searching the POIs.

The application provides a computer-readable medium, which records a computer program to be loaded into a mobile device to execute the aforementioned method for display surrounding POIs. The computer program is composed of a plurality of program instructions (for example, an organization chart establishing program instruction, a table approving program instruction, a setting program instruction, and a deployment program instruction, etc), and these program instructions are loaded into a mobile device and executed by the same to accomplish various steps of the method for displaying surrounding POIs.

According to the above descriptions, in the method, the mobile device and the computer-readable medium for displaying surrounding POIs of the application, the POI categories searched by the user are set as the searching condition. Then, each time when the user uses the mobile device to execute positioning to obtain new location information, the mobile device automatically finds the fit POIs according to the searching condition of the keyword, and displays the POIs. In this way, suitable POIs can be provided to the user for selection and reference.

In order to make the aforementioned and other features and advantages of the application comprehensible, several exemplary examples accompanied with figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DETAILED DESCRIPTION OF THE EXAMPLES

To ensure a mobile device automatically searching points of interest (POIs) and promptly displaying a searching result on a screen, in the application, a user sets a keyword in advance and the keywords is set as a searching condition for searching the POIs. Then, each time when the user uses the mobile device to execute a positioning function to update a current location, the mobile device automatically finds and displays POIs corresponding to the keyword set by the user. In this way, the user is unnecessary to execute an additional setting operation or execute a searching operation, which may improve convenience, instantaneity, and accuracy for searching the POIs.

Figure 1:
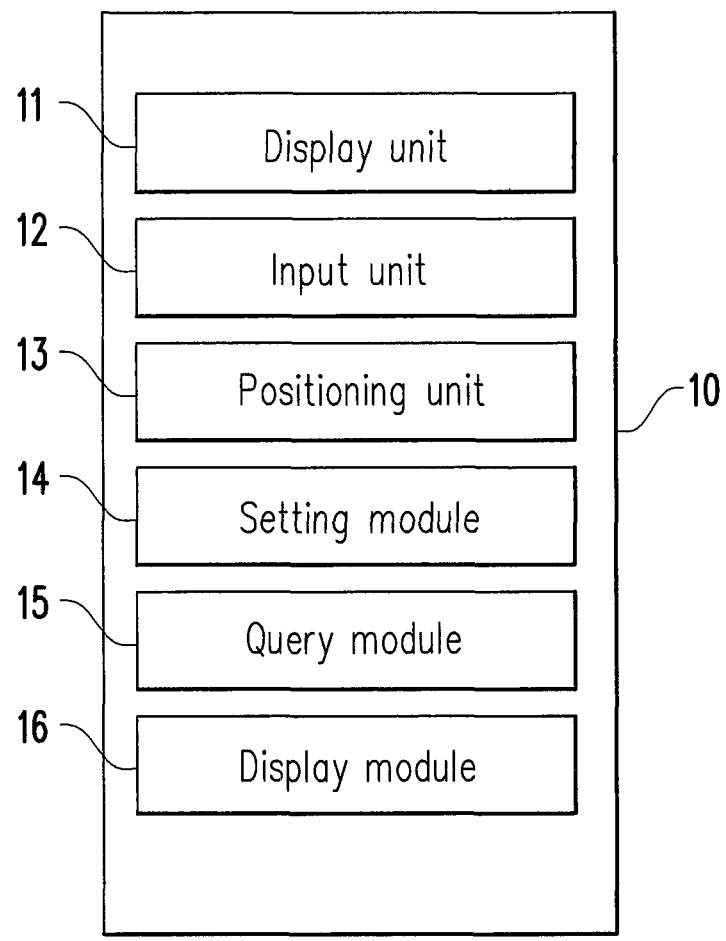
FIG. 1 is a block diagram illustrating a mobile device for displaying surrounding points of interest (POIs) according to an example of the application.

FIG. 1 is a block diagram illustrating a mobile device for displaying surrounding POIs according to an example of the application. Referring to FIG. 1, the mobile device 10 of the present example is, for example, a mobile phone, a smart phone, a personal digital assistant (PDA), a PDA phone, a flat panel computer, or an in-vehicle computer, which comprises a display unit 11, an input unit 12, a positioning unit 13, a setting module, a query module 15, and a display module 16, and functions thereof are respectively described in detail below.

The display unit 11 is, for example, a liquid crystal display (LCD), a light-emitting diode (LED) display, a field emission display (FED), or other categories of displays.

The input unit 12 is, for example, an input device such as a mouse, a keyboard, a joystick, or a touch panel, etc., which may receive an operation from a user.

The input unit 12 may also be a resistive, a capacitive, or other categories of touch sensing devices, which may be integrated with the display unit 11 to form a touch screen.

The positioning unit 13 is used to locate the mobile device 10 to obtain current location information of the mobile device 10. The positioning unit 13 is, for example, a global positioning system (GPS), or other communication positioning systems using a global system for mobile communication (GSM) system, a personal handy-phone system (PHS), a code division multiple access (CDMA) system, a wireless fidelity (Wi-Fi) system, a worldwide interoperability for microwave access (WiMAX) system, a radio repeater, or a radio broadcaster, etc., which is not limited by the application.

The setting module 14, the query module 15, and the display module 16 are, for example, hardware devices formed by combining logical circuit components, which may implement functions of searching and displaying the POIs. These modules may also be programs stored in a memory or a hard disk of the mobile device 10, which may be loaded into a processor of the mobile device 10 to execute the functions of searching and displaying the POIs. Examples are provided below to describe the mobile device 10 for displaying POIs in detail.

Figure 2:
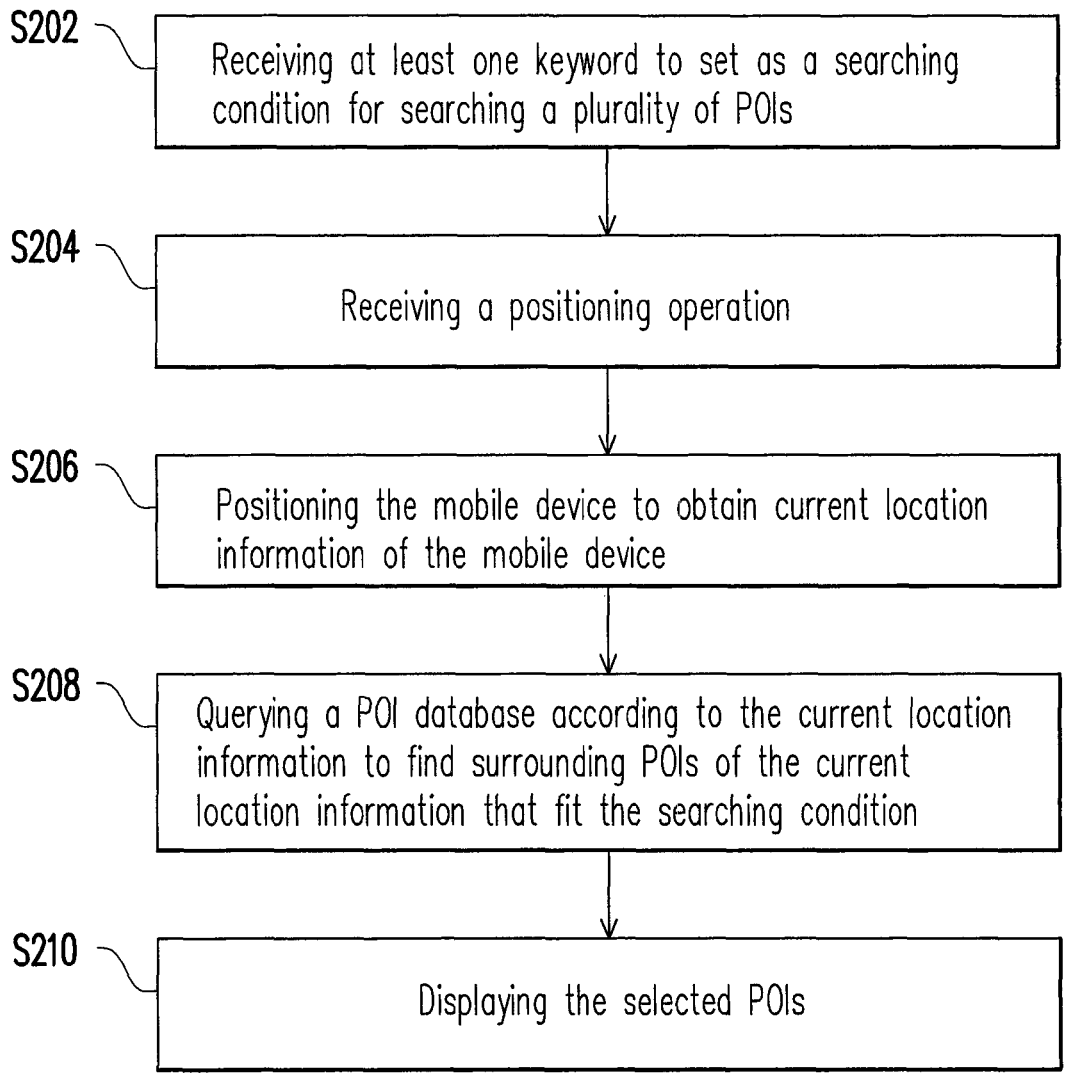
FIG. 2 is a flowchart illustrating a method for displaying surrounding POIs according to an example of the application.

FIG. 2 is a flowchart illustrating a method for displaying surrounding POIs according to an example of the application. Referring to FIG. 2, the method of the example is adapted to the mobile device 10 of FIG. 1, and the method for displaying the surrounding POIs is described in detail below with reference of various components of the mobile device 10.

First, the setting module 14 sets at least one keyword received by the input unit 12 as a searching condition for searching a plurality of POIs (step S202). The POIs comprise restaurants, banks, hotels, parks, shops, hospitals, cinemas, parking, and gas stations, etc., which are not limited by the application. The setting module 14 may first display a keyword setting interface to facilitate the user setting a preferred keyword in advance when the user uses the POI searching function for the first time.

Then, the input unit 12 receives a positioning operation from the user (step S204), and the query module 15 controls the positioning unit 13 to execute positioning to obtain current location information of the mobile device 10 (step S206). The positioning operation is, for example, to press a positioning key displayed on the display unit 11 to trigger the positioning unit 13 to execute the positioning function.

Then, the query module 15 queries a POI database according to the current location information obtained by the positioning unit 13 to find surrounding POIs of the positioning location information that fit the searching condition (step S208). The POI database is, for example, built in the mobile device 10, or set on a remote server (not shown), which may be directly queried by the mobile device 10 or indirectly queried by the mobile device 10 through a network connection, so as to find the POIs fitting the requirement of the user.

Finally, the display module 16 displays the searched POIs on the display unit 11 according to the keywords in the searching condition (step S210). In detail, in an example, the display module 16, for example, displays the searched POIs in rows in a POI list according to names or a sequence of the POIs. Since the searched POIs are greatly reduced in number and are all complied with the requirement of the user, and are directly displayed on the screen, the POI list facilitates the user quickly finding and viewing the required POIs.

In another example, the display module 16 may also display the POIs of each keyword in an independent page in a paging approach, and the page corresponding to a first keyword is located on top of all of the pages, where the first keyword is, for example, a keyword most commonly queried by the user, which may be displayed in priority. Now, if the input unit 12 receives a switching operation from the user, the display module 16 switches the page corresponding to a keyword currently displayed on the display unit 11 to a page corresponding to a next keyword.

Figure 3:
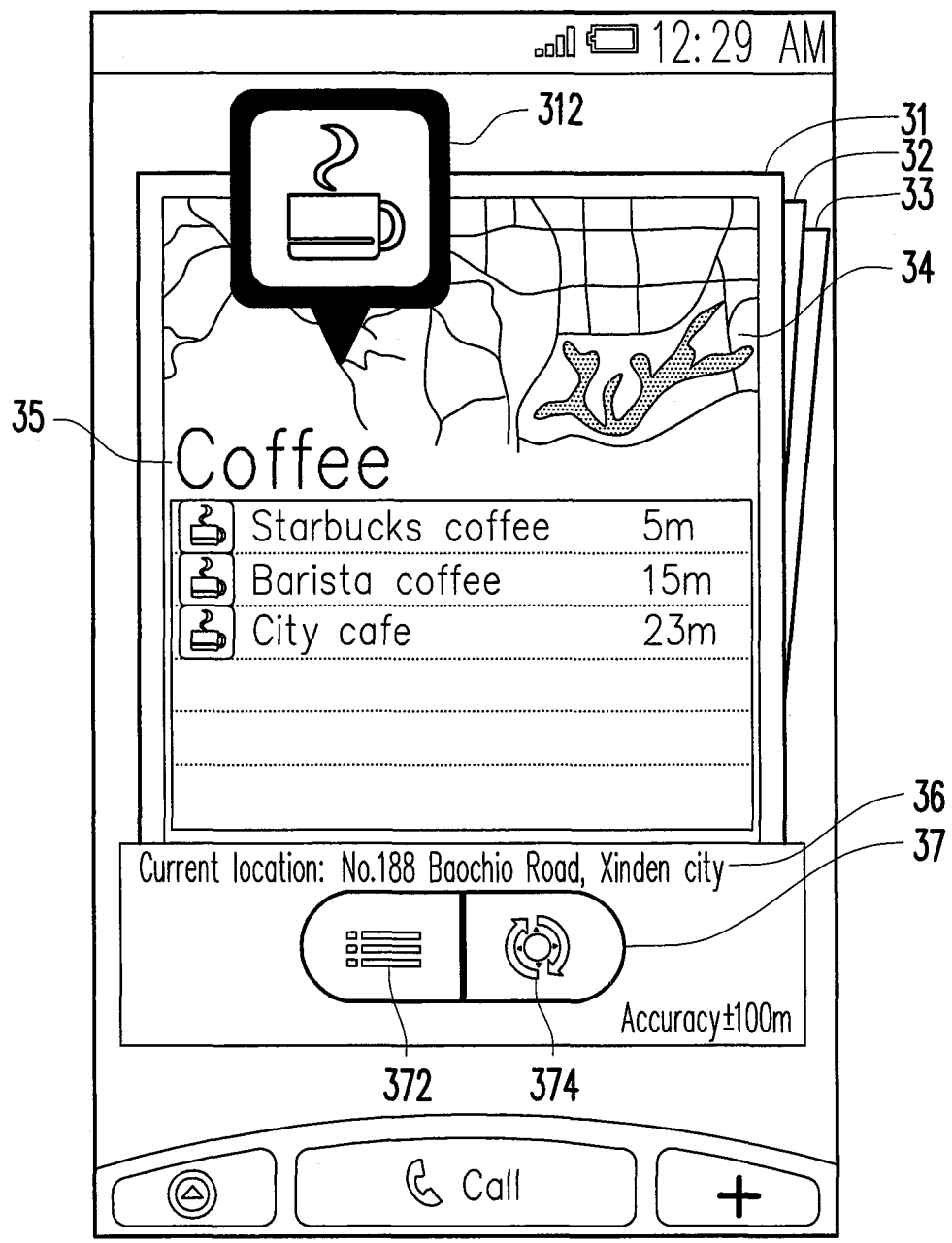
FIG. 3 is an example of a POI display interface according to an example of the application.

For example, FIG. 3 is an example of a POI display interface according to an example of the application. Referring to FIG. 3, in the POI display interface 30 of the example, a plurality of pages (for example, pages 31, 32, and 33) is used to display the POIs of different keywords. Where, the page 31, for example, displays a searching result of the POI database according to a main keyword set by the user, which comprises a map display field 34 and a POI display field 35.

The map display field 34 displays an electronic map around a current location of the mobile device, and an icon 312 (for example, a photograph of the POI or a mark) is used to mark a location of the mobile device in the electronic map.

The POI display field 35 displays a result that the mobile device queries the POI database according to a keyword (which is, for example, coffee) preset by the user, in which names and distances of coffee shops within 3 kilometres around the current location of the mobile device are displayed in rows for reference.

The POI display interface 30 further displays a location information display field 36 and a function key bar 37. The location information display field 36 may display an address of the current location of the mobile device, and an accuracy of the address.

The function key bar 37 comprises a POI list key 372 and a location update key 374. The user may press the POI list key 372 to control the mobile device to display the POI list, where the POI list displays in rows all of the POIs under the page 31 that are searched by the mobile device or the POIs of all of the pages 31, 32 and 33.

Moreover, the user may press the location update key 374 to control the mobile device to re-execute positioning to obtain location information of the current location, and re-query the POI database according to the location information to find the surrounding POIs of the current location that fit the searching condition. Alternatively, when the user switches the POI display interface from another functional interface, or the POI display interface is displayed for a predetermined time after the user switches the POI display interface from another functional interface, the mobile device may be controlled to re-execute positioning. Since the mobile device can automatically find the POIs fitting the keywords preset by the user, time required for finding the desired POIs or setting searching conditions is saved.

Moreover, the user may also switch the pages (the pages 31, 32, and 33) displayed on the POI display interface 30 through a touch-and-drag method (for example, dragging upwards, downwards, leftwards, or rightwards), so as to view the POIs corresponding to other keywords.

It should be noticed that in another example, the user may further set the POI categories in collaboration with the aforementioned keywords to precisely confine the searching condition to fit the requirement of the user. Another example is described below for detailed descriptions.

Figure 4:
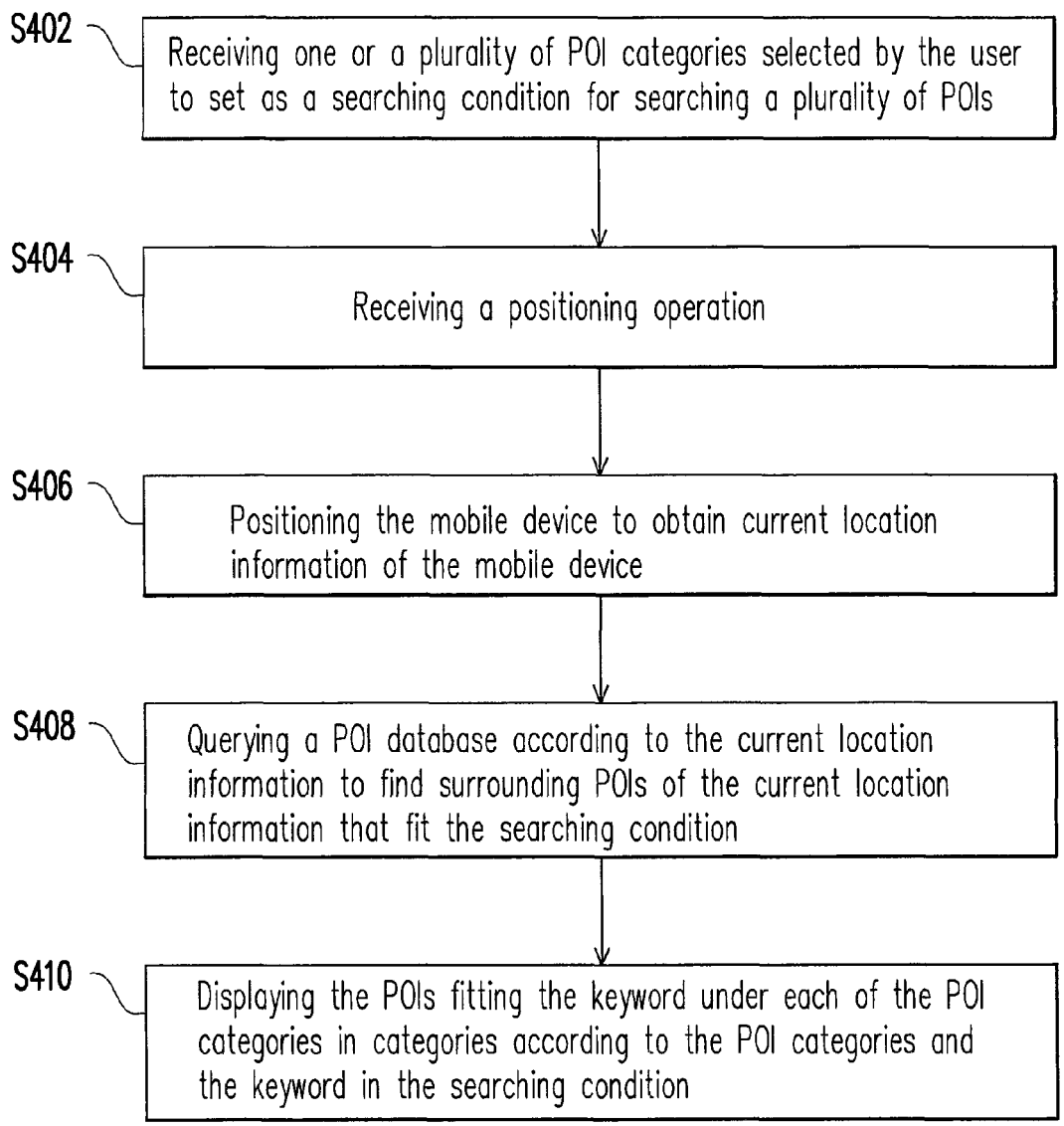
FIG. 4 is a flowchart illustrating a method for displaying surrounding POIs according to an example of the application.

FIG. 4 is a flowchart illustrating a method for displaying surrounding POIs according to an example of the application. Referring to FIG. 4, the method of the present example is adapted to the mobile device 10 of FIG. 1, and the method for displaying the surrounding POIs is described in detail below with reference of various components of the mobile device 10.

First, the setting module 14 provides a plurality of POI categories, and sets the POI categories as the searching condition for searching the POIs according to an active operation received by the input unit 12 from the user and the POI category received by the input unit 12 that is searched by the user (step S402). In another example, the input unit 12 also receives a searching distance input by the user, and the searching distance is set as one of the searching conditions, so as to limit a searching range of the POIs within an area of the searching distance.

Then, when the input unit 12 receives a positioning operation from the user (step S404), the query module 15 controls the positioning unit 13 to execute positioning to obtain current location information of the mobile device 10 (step S406). Then, the query module 15 queries the POI database according to the current location information obtained by the positioning unit 13 to find surrounding POIs of the current location information that fit the searching condition (step S408).

Finally, the display module 16 displays the searched POIs fitting the keyword under each of the POI categories in categories on the display unit 11 according to the POI categories and the keyword in the searching condition (step S410). The user may replace the keywords or add a new keyword at any time during a searching process of the POIs, so that the POIs searched by the query module 15 can be further complied with the requirement of the user.

In another example, the display module 16 may also display the POIs of each POI category in an independent page in a paging approach, and the page corresponding to a main POI category is displayed on top of all of the pages, where the main POI category is, for example, a category most commonly queried by the user. Now, if the input unit 12 receives a switching operation from the user, the display module 16 switches the page corresponding to the main POI category currently displayed on the display unit 11 to a page corresponding to a next POI category.

The application provides a computer-readable medium, which records a computer program to be loaded into a mobile device to execute the steps of the aforementioned method for display surrounding POIs. The computer program is composed of a plurality of program instructions (for example, an organization chart establishing program instruction, a table approving program instruction, a setting program instruction, and a deployment program instruction, etc), and these program instructions are loaded into the mobile device and executed by the same to accomplish various steps of the method for displaying surrounding POIs.

In summary, in the method, the mobile device, and the computer-readable medium for displaying surrounding POIs of the application, each time when the user executes the positioning function to update the current location, the surrounding POIs of the current location are then searched according to the searching conditions such as the keywords preset by the user, the POI categories, and the searching range, etc., so that the number of the searched POIs can be reduced, which avails the user quickly finding and viewing the desired POIs. Moreover, in the application, the method of using multiple pages to respectively display the POIs of different keywords facilitates the user switching the keywords, which improves utilization convenience.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A method for displaying surrounding points of interest (POIs) to be used by a mobile device, and the method comprising:
    receiving a first keyword and a second keyword;
    setting the first keyword as a first searching condition and the second keyword as a second searching condition for searching a plurality of POIs;
    receiving a first input on a location update key;
    detecting a first current location of the mobile device in response to the first input on the location update key;
    in response to detecting the first current location, automatically querying a POI database according to the first current location to find surrounding POIs of the first current location satisfying the first searching condition to generate a first POI list and to find surrounding POIs of the first current location satisfying the second searching condition to generate a second POI list, wherein the first POI list and the second POI list are generated as independent pages with the first POI list displayed on top of the independent pages;
    receiving a second input on the location update key;
    detecting a second current location of the mobile device in response to the second input on the location update key, wherein the second current location is different from the first current location;
    in response to detecting the second current location, automatically querying a POI database according to the second current location to find surrounding POIs of the second current location satisfying the first searching condition to generate a third POI list to replace the first POI list and to find surrounding POIs of the second current location satisfying the second searching condition to generate a fourth POI list to replace the second POI list;
    receiving a third input comprising a touch-and-drag operation to switch the fourth POI list to the top of the independent pages; and
    receiving a fourth input and displaying both the third POI list and the fourth POI list on the same independent page in response to receiving the fourth input.

2. The method according to claim 1, wherein the step of setting the first keyword as the first searching condition and the second keyword as the second searching condition comprises:
    receiving a setting of POI category, wherein the first searching condition and the second searching condition further comprises the POI category for searching the POIs.

3. The method according to claim 2, further comprising displaying surrounding POIs satisfying the first keyword in categories according to the POI category and the first keyword in the first searching condition, and displaying surrounding POIs satisfying the second keyword in categories according to the POI category and the second keyword in the second searching condition.

4. The method according to claim 3, wherein the step of displaying the surrounding POIs in categories comprises:
    displaying POIs of each of the POI categories, by the display, in an independent page; and
    displaying the pages, by the display, corresponding to the POI categories in overlapping.

5. The method according to claim 1, wherein the step of setting the first keyword as the first searching condition and the second keyword as the second searching condition comprises:
    receiving a searching distance input by a user, wherein the first searching condition and the second searching condition further comprises the POI category for searching the POIs.

6. A mobile device for displaying surrounding points of interest (POIs), comprising:
    an input device, configured to receive a first keyword and a second keyword input by a user, to receive a first input on a location update key to detect a first current location of the mobile device, to receive a second input on a location update key to detect a second current location of the mobile device, to receive a third input comprising a touch-and-drag operation and to receive a fourth input;
    a communication positioning system, configured to execute positioning to obtain the first current location of the mobile device and the second current location of the mobile device, wherein the first current location is different from the second current location;
    a setting circuit, configured to set the first keyword as the first searching condition and the second keyword as the second searching condition for searching a plurality of POIs;
    a query circuit, configured to automatically find surrounding POIs of the first current location satisfying the first search condition to generate a first POI list, surrounding POIs of the first current location satisfying the second search condition to generate a second POI list, surrounding POIs of the second current location satisfying the first search condition to generate a third POI list, and surrounding POIs of the second current location satisfying the second search condition to generate a fourth POI list;

a display screen, configured to display the first POI list, the second POI list, the third POI list and a fourth POI list; and a display circuit, configured to display the first POI list, the second POI list, the third POI list and the fourth POI list on the display screen, wherein, in response to the detection of the first current location, the first POI list and the second POI list are generated as independent pages with the first POI list displayed on top of the independent pages, wherein, in response to the detection of the second current location, the third POI list is generated to replace the first POI list and the fourth POI list is generated to replace the second POI list, wherein, in response to the touch-and-drag operation, the forth POI list is switched to the top of the independent pages, wherein, in response to the fourth input, both the third POI list and the fourth POI list are displayed on the same independent page.

7. The mobile device according to claim 6, wherein the input device further receives a setting of POI category, and the setting circuit sets the POI category as the first searching condition and the second searching condition for searching the POIs.

8. The mobile device according to claim 7, wherein the display circuit displays POIs satisfying the first keyword under each of the POI categories in categories according to the POI categories and the second keyword in the second searching condition, and the display circuit displays POIs satisfying the second keyword under each of the POI categories in categories according to the POI categories and the second keyword in the second search condition.

9. The mobile device according to claim 8, wherein the display circuit displays POIs of each of the POI categories in an independent page, and displays the pages corresponding to the POI categories in overlapping.

10. The mobile device according to claim 6, wherein the input device further receives a searching distance from the user, and the setting circuit sets the searching distance as the first searching condition and the second searching condition for searching the POIs.

11. A non-transitory computer-readable medium, recording program instructions for:

receiving a first keyword and a second keyword;

setting the first keyword as a first searching condition and the second keyword as a second searching condition for searching a plurality of POIs;

receiving a first input on a location update key;

detecting a first current location of the mobile device in response to the first input on the location update key;

in response to detecting the first current location, automatically querying a POI database according to the first current location to find surrounding POIs of the first current location satisfying the first searching condition to generate a first POI list and to find surrounding POIs of the first current location satisfying the second searching condition to generate a second POI list, wherein the first POI list and the second POI list are generated as independent pages with the first POI list displayed on top of the independent pages receiving a second input on the location update key;

detecting a second current location of the mobile device in response to the second input on the location update key, wherein the second current location is different from the first current location;

in response to detecting the second current location, automatically querying a POI database according to the second current location to find surrounding POIs of the second current location satisfying the first searching condition to generate a third POI list to replace the first POI list and to find surrounding POIs of the second current location satisfying the second searching condition to generate a fourth POI list to replace the second POI list;

receiving a third input comprising a touch-and-drag operation to switch the fourth POI list to the top of the independent pages; and receiving a fourth input and displaying both the third POI list and the fourth POI list on the same independent page in response to receiving the fourth input.

12. The method according to claim 1, further comprising:

receiving an active operation of a POI list key input by a user;

displaying all POIs corresponding to the keyword in one independent page when receives the active operation.

13. The method according to claim 1, further comprising:

receiving a third keyword input by a user, by a processor of the mobile device, to preset as a third searching condition; and receiving the touch-and-drag operation from the input device of the mobile device to switch the page of the second searching condition to the page of the third searching condition displayed on the display screen.

14. The mobile device according to claim 6, wherein the display screen further displays a page of a third searching condition;

the input device further receives a third keyword input by a user, and to receive a the touch-and-drag operation to switch the page of the second searching condition to the page of the third searching condition;

the setting circuit further set the third keyword as the third searching condition; and the query circuit further automatically find surrounding POIs of a third current location satisfying the third searching condition.

* * * * *